US006592736B2

(12) United States Patent
Fulton et al.

(10) Patent No.: US 6,592,736 B2
(45) Date of Patent: Jul. 15, 2003

(54) METHODS AND APPARATUS FOR CONTROLLING AN AMOUNT OF A CHEMICAL CONSTITUENT OF AN ELECTROCHEMICAL BATH

(75) Inventors: Dakin Fulton, Whitefish, MT (US); Thomas L. Ritzdorf, Big Fork, MT (US)

(73) Assignee: Semitool, Inc., Kalispell, MT (US)

( * ) Notice: Subject to any disclaimer, the term of this patent is extended or adjusted under 35 U.S.C. 154(b) by 0 days.

(21) Appl. No.: 09/683,597

(22) Filed: Jan. 23, 2002

(65) Prior Publication Data

US 2003/0015417 A1 Jan. 23, 2003

Related U.S. Application Data

(60) Provisional application No. 60/303,950, filed on Jul. 9, 2001.

(51) Int. Cl.[7] .............................. C25D 5/00; C25D 3/00; C25B 15/00
(52) U.S. Cl. .................... 205/81; 205/335; 204/232; 436/43
(58) Field of Search .................... 209/232; 205/81, 205/335; 436/43

(56) References Cited

U.S. PATENT DOCUMENTS

| | | | |
|---|---|---|---|
| 3,649,509 A | * | 3/1972 | Morawetz et al. .......... 204/238 |
| 3,878,066 A | | 4/1975 | Dettke et al. |
| 3,904,493 A | | 9/1975 | Losi et al. |
| 4,055,751 A | | 10/1977 | Bussmann et al. |
| 4,090,926 A | | 5/1978 | Matson |
| 4,132,605 A | | 1/1979 | Tench et al. |
| 4,146,437 A | | 3/1979 | O'Keefe |
| 4,229,218 A | | 10/1980 | Gulla et al. |
| 4,324,589 A | | 4/1982 | Gulla et al. |
| 4,326,940 A | * | 4/1982 | Eckles et al. ............. 204/232 |
| 4,541,902 A | | 9/1985 | Kinoshita et al. |
| 4,886,590 A | * | 12/1989 | Tittle ..................... 204/232 |
| 4,895,739 A | | 1/1990 | Bladon |
| 4,917,774 A | | 4/1990 | Fisher |

(List continued on next page.)

OTHER PUBLICATIONS

Sun, Z.–W., and G. Dixit, "Optimized Bath Control for Void–Free Copper Deposition," *Solid State Technology*, Nov. 2001.

Lowenheim, F.A., *Electroplating*, McGraw–Hill Book Co., New York, 1978, pp. 120–121.

Tench, D., and J. White, "Cyclic Pulse Voltammetric Stripping Analysis of Acid Copper Plating Baths," *Journal of the Electrochemical Society* 132(4):831–834, 1985.

Willard, H.H., et al., *Instrumental Methods of Analysis*, 5th ed., D. Van Nostrand Co., New York, 1974, pp. 647–656.

*Primary Examiner*—Donald R. Valentine

(57) ABSTRACT

An automated chemical management system for managing the chemical content of an electrochemical bath used to deposit a material on the surface of a microelectronic workpiece is set forth. The automated chemical management system includes a dosing system that is adapted to dose an amount of one or more chemicals to replenish a given electrochemical bath constituent in accordance with a predetermined dosing equation. The chemical management system also includes an analytical measurement system that is adapted to provide a measurement result indicative of the amount of the given constituent in the electrochemical bath at predetermined time intervals. The chemical management system uses the measurement results to modify the dosing equation of the dosing system. In this manner, the replenishment operations executed by the chemical management system are effectively refined over time thereby providing more accurate control of the amount of the target constituent in the electrochemical bath.

57 Claims, 4 Drawing Sheets

U.S. PATENT DOCUMENTS

| | | |
|---|---|---|
| 4,917,777 A | 4/1990 | Fisher |
| 4,948,473 A | 8/1990 | Phillippi |
| 4,952,286 A | 8/1990 | Bladon et al. |
| 5,007,990 A | 4/1991 | Bladon |
| 5,192,403 A | 3/1993 | Chang et al. |
| 5,196,096 A | 3/1993 | Chang et al. |
| 5,223,118 A | 6/1993 | Sonnenberg et al. |
| 5,234,573 A | 8/1993 | Takami |
| 5,364,510 A | 11/1994 | Carpio |
| 5,368,715 A * | 11/1994 | Hurley et al. ............ 204/232 X |
| 5,389,215 A | 2/1995 | Horiuchi et al. |
| 5,391,271 A | 2/1995 | Ludwig |
| 5,484,626 A | 1/1996 | Storjohann et al. |
| 5,534,128 A | 7/1996 | Aso et al. |
| 6,113,769 A | 9/2000 | Uzoh et al. |
| 6,254,760 B1 * | 7/2001 | Shen et al. ............. 204/232 X |
| 6,365,033 B1 | 4/2002 | Graham et al. |

* cited by examiner

METHODS AND APPARATUS FOR CONTROLLING AN AMOUNT OF A CHEMICAL CONSTITUENT OF AN ELECTROCHEMICAL BATH

CROSS REFERENCE TO RELATED APPLICATIONS

This application claims the benefit of provisional application U.S. Ser. No. 60/303,950, filed Jul. 9, 2001.

BACKGROUND OF INVENTION

One technology that is rapidly coming to the forefront for the formation of microelectronic devices and components is electrochemical deposition, which includes both electroplating and electroless plating of metal to form microelectronic features on a microelectronic workpiece. Though electrochemical deposition has long been employed as a fundamental step in fabrication of multilevel printed circuit boards, application of electrochemical deposition to fill sub-micron interconnect features is relatively recent and poses further additional problems, including the need for more stringent control of the electrolyte bath composition.

Electrochemical deposition is a complex process involving multiple ingredients in the electrolytic bath. If the electrolytic bath is to provide high-quality deposited films (blanket or patterned) on the surface of the substrate, the concentration of several of the constituents of the bath should be maintained. As such, the ability to monitor and control the composition of the bath is one of the important factors in ensuring uniform and reproducible film properties. In semiconductor and microelectronic component applications, the electronic and morphological properties of the metal films are of principal importance in determining final device performance and reliability. The stability of later microfabrication processes in the manufacturing sequence likewise frequently depends on repeatable mechanical properties, including modulus, ductility, hardness, and surface texture of the deposited material. All of these deposit properties are controlled or strongly influenced by the composition of the electrolytic bath.

Measurement and control of proprietary organic compounds that serve to modify the deposit properties through adsorption onto and desorption from the cathode surface during, for example, electroplating, are important since they affect the diffusion rate of metal cations to nucleation and growth sites. These compounds are typically delivered as multi-component packages from chemistry vendors. One of the functions of the additive packages is to influence the throwing power of the electroplating bath: the relative insensitivity of plating rate to variations in cathodic current density across the wafer or in the vicinity of surface irregularities. The throwing power of the electrolyte has an effect on the cross-wafer uniformity of deposited film thickness and the success with which ultrafine trenches and vias (holes) are filled without included seams or voids. Organic additives have also been shown to have substantial effects on mechanical film properties. Detection and quantification of these bath constituents is complicated by the fact that they are effective at very low concentrations in the electrolyte, for example, at several ppm or less.

Bath analysis for microelectronic applications is strongly driven by the need to limit variability and maintain device yields through maintenance of optimized process parameters. One method for controlling such ingredients in an electroplating bath is to make regular additions of particular ingredients based upon empirical rules established by experience. However, depletion of particular ingredients is not always constant with time or use. Consequently, the concentration of the ingredients is not actually known and the level in the bath eventually diminishes or increases to a level where it is out of the acceptable concentration range. If the additive content concentration deviates too far from the target value, the quality of the deposit suffers and the deposit may be dull in appearance and/or brittle or powdery in structure. Other possible consequences include low throwing power and/or plating folds with bad leveling.

SUMMARY OF INVENTION

An automated chemical management system for managing the chemical content of an electrochemical bath used to deposit a material on the surface of a microelectronic workpiece is set forth. The automated chemical management system includes a dosing system that is adapted to dose an amount of one or more chemicals to replenish a given electrochemical bath constituent in accordance with a predetermined dosing equation. The chemical management system also includes an analytical measurement system that is adapted to provide a measurement result indicative of the amount of the given constituent in the electrochemical bath at predetermined time intervals. The chemical management system uses the measurement results to modify the dosing equation of the dosing system. In this manner, the replenishment operations executed by the chemical management system are effectively refined over time thereby providing more accurate control of the amount of the target constituent in the electrochemical bath.

DETAILED DESCRIPTION

As the microelectronics fabrication industry moves toward widespread use of electrochemical deposition, particularly of micro-structures, there is an increased need for highly accurate dosing systems that replenish the various components of the electrochemical bath. To this end, dosing systems have been developed for use with electrochemical deposition tools that are used at microelectronic fabrication facilities. Most known systems, however, execute the dosing function solely using open-loop, predetermined models that replenish the electroplating bath constituents based on empirically determined data. Such systems may be suitable for certain electrochemical deposition processes, but become less viable as new device requirements impose more rigorous standards on the make-up of the electrochemical bath.

The present inventors have recognized that the electrochemical bath constituents may be more accurately controlled using an automated chemical management system that refines its dosing parameters based on the taking of automatic analytical measurements of the organic and/or inorganic constituents. For example, elapsed time based dosing and/or elapsed amp-time based dosing may be executed by the automated chemical management system consistent with a respective set of one or more dosing equations/parameters. These dosing equations/parameters can be refined by modifying them in response to the automatic analytical measurements, which provide a more accurate measurement of a particular constituent. Refinement of these equations/parameters, in turn, allows the automated chemical management system to more precisely define what is otherwise an open-loop dosing model thereby providing more accurate elapsed time based and/or elapsed amp-minute based dosing.

Figure 1:
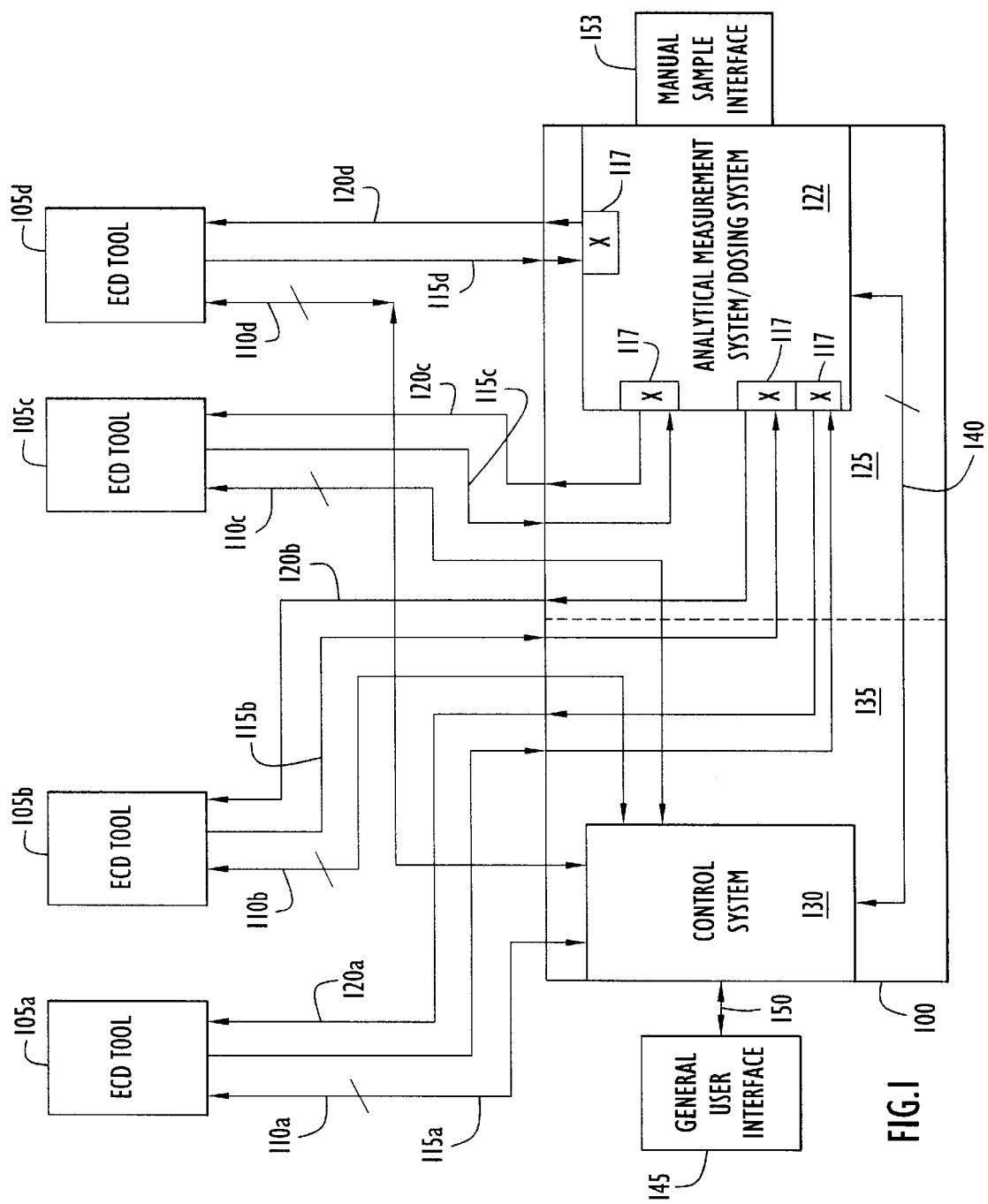
FIG. 1 is a block diagram of an automated chemical management system that is connected to service a plurality of electrochemical deposition tools.

An exemplary automated chemical management system that is suitable for implementing the above-noted dosing operations is illustrated in FIG. 1. As shown, a single chemical management system, shown generally at 100, may be connected to analyze and control the constituents of the electrochemical baths used in a plurality of electrochemical deposition tools 105a–105d. Although the chemical management system 100 of the illustrated embodiment is connected for use with four different electrochemical deposition tools, it will be recognized that a single system may be used to manage the electrochemical baths of a larger or lesser number of tools.

Each of the electrochemical deposition tools 105a–105d are connected to the automated chemical management system 100 by a plurality of lines. Lines 110a–110d are communication links and are provided to allow the exchange of data between the respective electrochemical deposition tools and the automated chemical management system 100. These lines may be in the form of wireless data connections, one or more electrically conductive lines, one or more optical transmission lines, combinations of the foregoing, etc.

A flow of electrolyte from the electrochemical baths of each of the individual electrochemical deposition tools 105a–105d is provided as a slipstream through the automated chemical management system 100. Samples of the electrolyte for a given electrochemical deposition tool 105a–105d may be extracted from the respective slipstream for automated analysis of the organic and inorganic constituents of the bath. Likewise, replenishment of the bath constituents may take place by dosing the proper amount of the constituents into the slipstream for return to the electrochemical bath of the respective electrochemical deposition tool. In the illustrated embodiment, each slipstream is comprised of a fluid inlet line 115a–115d that provides a stream of the electrolyte from the respective electrochemical deposition tool to the chemical management system 100, and a fluid outlet line 120a–120d that directs the stream of the electrolyte, along with any additives dosed into the stream, back to the electrochemical bath of the respective electrochemical deposition tool 105a–105d. In order to prevent any backflow of the replenishment chemical through lines 115a–115d, each such line is provided with a respective valve assembly 117 that is closed as the replenishment chemical is injected into the respective slipstream. As such, all of the replenishment chemical injected into the slipstream is directed to the respective outlet line 120a–120d.

The automated chemical management system 100 may be comprised of a plurality of independent enclosed areas. For example, the analysis modules, the reagents necessary for the analyses, the dosing module, and the dosing feeds, all of which are shown generally at 122, may be commonly housed in a first enclosed area 125 while a control system 130 and other electronics used by the management system 100 may be commonly housed in a second enclosed area 135. Areas 125 and 135 may be physically isolated portions of the same housing, physically separate housings, separate housings that have been physically joined to one another, etc. The various portions of each of the systems and areas 125 and 135 may be mounted on slidable modules to aid in maintenance and serviceability. Items requiring service or regular maintenance may be disposed for access at a front portion of the system 100 for As noted above, each of the electrochemical deposition tools 105a–105d is connected to communicate information to the chemical management system 100. More particularly, the signals at lines 110a–110d mare provided to the control system 130 for monitoring and/or processing. Exemplary signals received from each of the electrochemical deposition tools 105a–105d may include amp-minute data indicative of the extent to which the corresponding electrochemical bath has been used for deposition, and plating tank fluid level data indicative of the amount of the electrochemical bath present in a given tool, and other information pertaining to the electrochemical bath. Further, each tool may provide an indication to the chemical management system 100 that it is off-line (e.g., not running) and/or that the tool is not accepting replenishment (e.g., when the level of the electrochemical bath in the respective tool is full or beyond a level at which it can receive further chemicals). Exemplary signals sent from the chemical management system 100 to each of the electrochemical deposition tools 105a–105d include the following:

| | Exemplary Signals | |
|---|---|---|
| Description | Action on Plating Tool | ACMS Alarm Tied to Interlock |
| ECD Bath is not OK | Ring Alarm + Run-to-safe | Concentration of any component above or below alarm set point |
| ACMS not ready | Display only | Any user defined condition |
| ACMS Chemistry Low | Display only | Low level alarm |
| ACMS replenish ready | Load inhibit | Any user defined condition |
| ACMS non-critical alarm | Display only | Any user defined condition |

The control system 130 is also connected via one or more lines 140 to the analytical measurement system/dosing system 122. The signals provided along lines 140 allow the control system 130 to direct the analytical measurement system/dosing system 122 in the execution of the operations necessary in the performance of the following functions: 1) extraction of a sample of the electrochemical bath that is to be analyzed from a slipstream; 2) execution of an analytical technique on the electrochemical bath sample; 3) calculation of the amount of the electrochemical bath constituent present in the sample based on the results of the analytical technique or otherwise deriving a similarly useful measurement result indicative of the amount of the constituent in the sample; 4) using the measurement results to modify the parameters used in one or more equations that, in turn, are used to dose the constituent between analytical measurements; and 5) optionally, using the resulting measurement to automatically control the supply of an amount of the constituent to replenish the electrochemical bath.

The automated chemical management system 100 may be programmed to allow operator selection of various operating parameters, dosing recipes, etc. In the illustrated embodiment, a general user interface 145 is connected for communication with the control system 130 to allow such operator interaction. The general user interface 145 may take on any of a variety of forms. For example, it may be implemented as a standard CRT/keyboard arrangement, a touch screen, an in-situ personal computer, a remote computer, an access screen on the plating tool, etc. Similarly, the communication link 150 between the control system 130 and the general user interface 145 may be implemented in a variety of manners. For example, the link 150 may be comprised of a standard hard-wired line, a wireless link, an optical link, or a combination of the foregoing.

Figure 2:
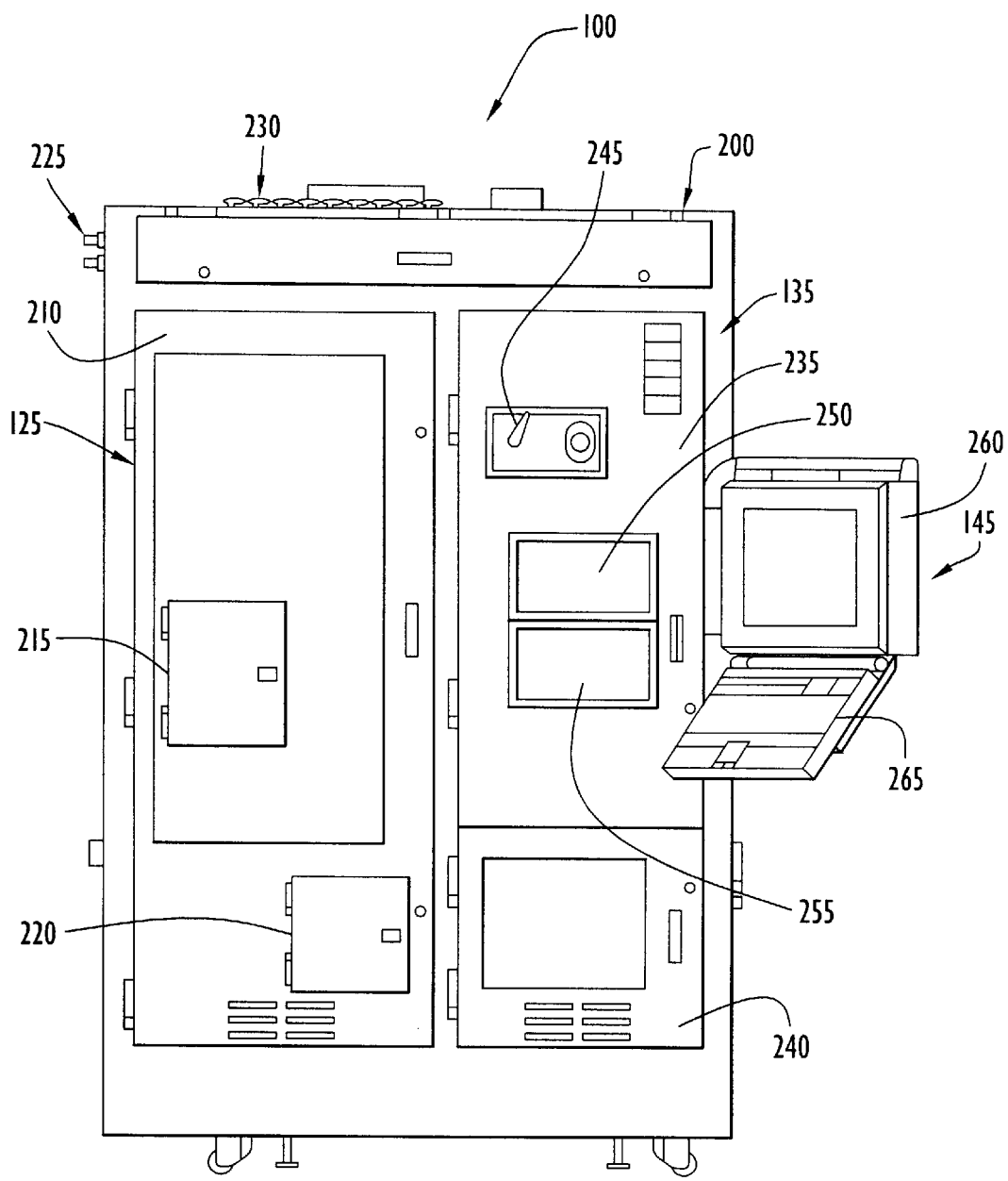
FIG. 2 is a plan view of one potential physical layout of the automated chemical management system.

FIG. 2 illustrates one manner in which the automated chemical management system 100 may be physically constructed. Here, areas 125 and 135 shown in FIG. 1 are located within a common housing 200. Area 125 of this embodiment is disposed on the left-hand side of the common housing 200 while area 135 is disposed on the right-hand side of the housing. Area 125 is generally accessible through a door 210 that, in turn, includes further sub-doors 215 and 220. Sub-door 215 may be used to access fill ports that are connected to the various chemical containers in area 125. Sub-door 220 may be used to manually provide an electrolyte sample for analysis by the chemical management system 100 to a manual sample interface 153 shown in FIG. 1. In this manner, system 100 may be used to analyze electrolyte extracted from a slipstream as well as electrolyte provided manually by an operator. An array of slipstream connectors 225 are disposed at the left side panel of housing 200. Provision is also made in this embodiment for slipstream and bulked fill shut offs, which are shown here at 230 on the top panel of housing 200.

Area 135 of the illustrated embodiment is accessible through two doors 235 and 240. Door 235 includes a plurality of panels that provide various ways in which the operator can receive information from and interact with the system 100. For example, panel 245 may include an interface that allows the operator to disconnect the main power source from the unit and/or otherwise to initiate an emergency power off procedure. Panels 250 and 255 can be used to indicate the status of and/or initiate various operations associated with the inorganic constituent analysis and the organic constituent analysis, respectively. Most interaction between the operator and the system 100, however, takes place through the general user interface 145, shown here as a touch screen 260 and keyboard 265 combination.

Although specific examples of the physical construction of the system 100 have been set forth, it will be recognized that the system 100 may take on any number of a wide range of physical configurations while still incorporating various inventive features disclosed herein. For example, it is possible to incorporate the following operational methods and apparatus into an automated chemical management system that does not correspond to the physical configurations described above.

With reference again to FIG. 1, the automated chemical management system 100 is programmed to allow the operator to select one or more modes for dosing a given chemical for replenishment of a given electrochemical bath constituent. For example, control system 130 may be programmed to allow the operator to select one or more of the following dosing modes through the general user interface 145:

Manual—In accordance with the manual dosing mode, the automated chemical management system 100 delivers an operator requested volume of chemistry to a chosen slip stream on command from the operator.

Analysis Based—Analysis based dosing generally takes place upon completion of an analysis measurement cycle in which a given constituent of the electrochemical bath has been automatically analyzed by the system 100. The schedule for the analyses may be set by the operator and entered through the general user interface 145. Once an analysis result is obtained, the result is compared to a predetermined value or range of values. If the result is below this predetermined value, thereby indicating a deficiency of the constituent in the bath, the chemical management system 100 calculates the volume of chemistry that must be dosed into the respective slipstream to return the constituent to a target value (often, the same as the predetermined value against which the measurement value is compared). That amount is then directed into the bath through the respective slipstream. If the measured result is greater than the predetermined value, thereby indicating an excess amount of the constituent in the bath, further dosing based on other concurrent dosing modes may be suspended for a period of time that is sufficient to allow the concentration of that constituent to decrease to the target value. The period of time may be a fixed value that is entered by the operator, a value that is calculated from the depletion rates used to control the other replenishment modes, a time period that is set when the analyses indicate that the analysis result is below the predetermined value, etc.

The measurement value may be compared against separate upper and lower predetermined values. In such instances, a degree of hysteresis is introduced into the analysis replenishment mode that may serve to enhance overall system stability.

As will be set forth in further detail below, the measurements obtained from the analysis may be used to alter the equations used by the control system 130 to dose a given chemical into the electrochemical bath in other dosing modes. Consequently, an analytical measurement cycle need not be followed by a corresponding dose of a chemical before it can be considered useful. Rather, in the system set forth herein, the measurements obtained through the analyses are beneficially used to refine the equations used in controlling the dosing that occurs in other dosing modes of the system. In such instances, analysis based dosing is in effect implemented in an indirect manner through the other dosing modes since dosing in those modes is dependent on analysis results.

Elapsed Time Based—This replenishment method may be used to compensate for the concentration decay of a constituent as a function of time. It may be used alone or in combination with other dosing modes. When used alone, it functions by calculating the amount of chemical decay accumulated over a period of time until the volume of chemical for replenishment reaches a threshold, at which time a dose of a predetermined volume of the chemical is directed into the slipstream for delivery to the respective electrochemical bath. Generally, the time period used in the calculation corresponds to the elapsed time since the last elapsed time based replenishment.

When used in conjunction with other dosing modes, it is the combined concentration decay calculated in each dosing mode that results in an accumulated concentration decay value that is compared quantitatively with one or more replenishment threshold values. The replenishment threshold, for example, may be set to equal twice the minimum dose that the system is capable of dispensing (e.g., if the minimum dose deliverable by the system is 5 ml, then the system may be programmed to deliver a dose when the accumulated concentration decay value corresponds to 10 ml).

The coefficient(s) of the equations used to calculate elapsed time concentration decay may be initially entered by the operator through the general user interface 145. The coefficient(s), in turn, may constitute the portion of the equation that is automatically adjusted by the system in response to the analysis results.

Elapsed Amp-time Based—This replenishment mode functions in substantially the same manner as the elapsed time based mode; however, the equations of this mode are used to compensate for the decay of a bath constituent resulting from use of the bath. For example, this mode may be used to compensate for the decay of a bath constituent based on the plating load (amp-minutes) placed on the bath.

The coefficient(s) in the equations used to calculate elapsed amp-minute concentration decay may be initially entered by the operator through the general user interface 145. The coefficient(s), in turn, may constitute the portion of the equation that is automatically adjusted by the system in response to the analysis results.

Sample Loss Based—This replenishment mode may be used to replace the volume of the electrochemical bath removed from the slipstream by the system 100 for analysis. The actual amount that is to be removed for various analyses may be entered by the operator during, for example, system initialization. In this mode, an amount of virgin electrolyte corresponding to the amount of the electrochemical bath removed is injected into the slipstream for volume replenishment. Other chemicals may be used for such replenishment as well. For example, an amount of deionized water may be used in lieu of the virgin electrolyte.

Bath Make-up—This replenishment mode is only used when a new bath is to be provided to one of the electrochemical deposition tools 105a–105d. In accordance with this mode, an amount of virgin electrolyte (i.e., an electrolyte without organic additives) is delivered from a bulk chemical delivery system into an electrochemical bath reservoir of the electrochemical deposition tool. Once the reservoir has been filled to a predetermined level, the operator directs the automated chemical management system 100 to add the organic components in a predetermined mix. At this point, the bath will be at time zero and there will be no applied amp-minutes. Replenishment based on time and amp-minutes begins at this time, with the appropriate adjustments for the analysis results.

Resetting of elapsed time and elapsed amp-minute counters may be accomplished by a function that is accessible to the operator through the general user interface 145 or automatically by the chemical management system. Accordingly, when an electrochemical deposition tool receives a new electrochemical bath, this fact may be communicated to the control system 130 over the corresponding communication link 110a–110d.

Figure 3:
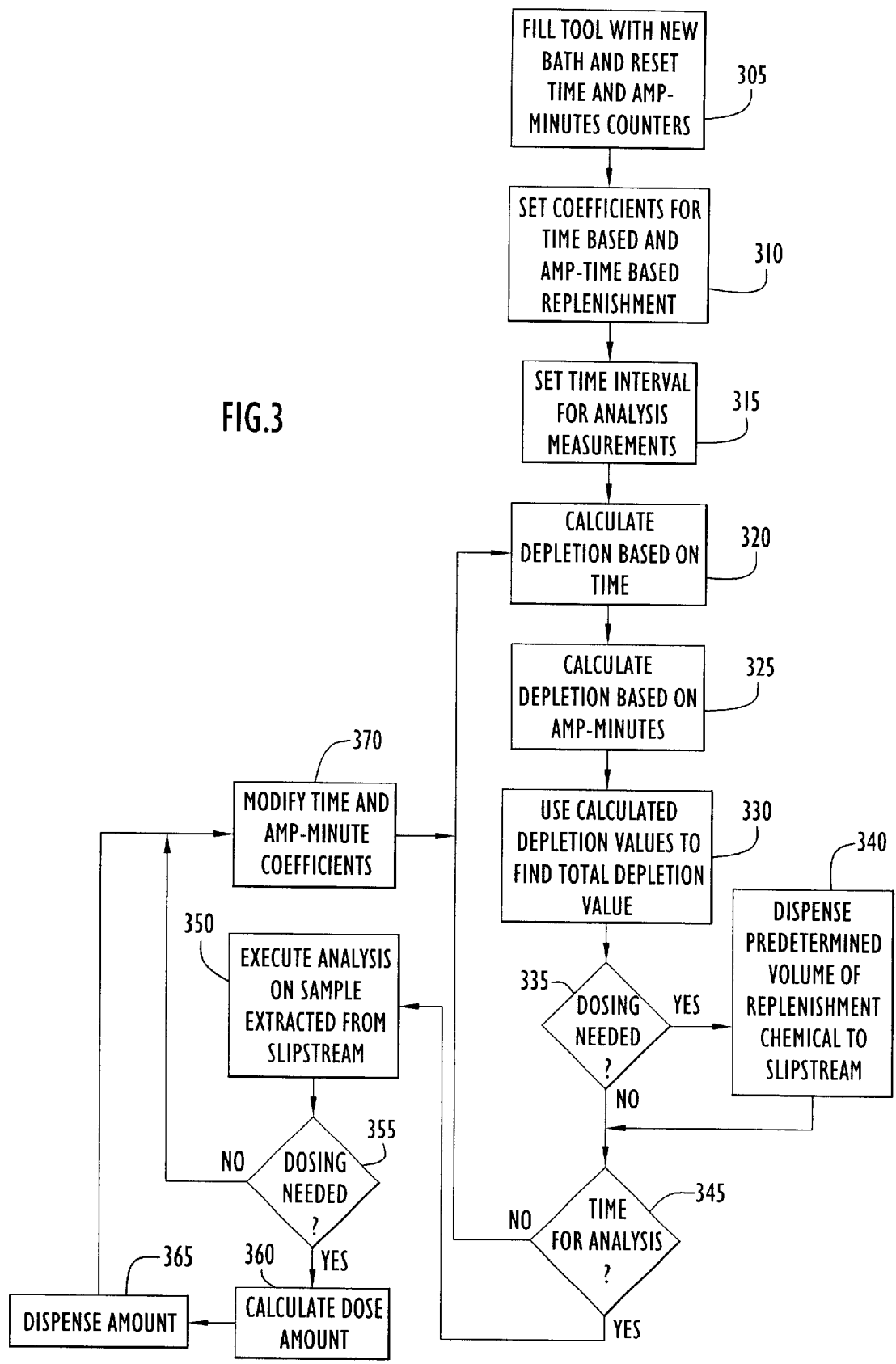
FIG. 3 is a flow diagram illustrating one manner in which multiple mode replenishment may be executed in the automated chemical management system of FIG. 1.

FIG. 3 is a flow diagram illustrating one manner of implementing an automated chemical management system 100 that uses a combination of analysis based replenishment, elapsed time replenishment and elapsed amp-time replenishment to control a bath constituent. As shown, an electrochemical deposition tool is filled with a new electrochemical bath at step 305. The bath may be provided to the tool and mixed to the required composition in accordance with the bath make-up mode of operation described above. Since the electrochemical deposition tool is now using a new bath, the elapsed time and elapsed amp-minute counters are reset.

Steps 310 and 315 are directed to the information provided to the system 100 by the operator through the general user interface 145. Such information may include the following:

The equations that are to be used to calculate concentration decay based on elapsed time and elapsed amp-minutes (for simplicity, such equations may be built into the code of the operating system and need not be selectable by the operator);

The coefficients for one or more of the equations used to calculate concentration decay based on elapsed time and elapsed amp-minutes;

The amount of chemical that is to be provided to the slipstream when the calculated concentration decay falls below a predetermined threshold value or is otherwise outside a predetermined value range;

The type of analysis (Chronoamperometry, CVS, CPVS, etc.) that is to be used to analyze the constituent, including the parameters for the analysis;

The analysis schedule; and

The amount of chemical (or the corresponding equation used to calculate the amount) that is to be provided to the slipstream based on the analysis value.

With the foregoing steps completed, the automated chemical management system 100 is ready to execute a repeating sequence of replenishment decisions and operations that are directed to maintaining the constituent of the electrochemical bath at a predetermined concentration level. In the illustrated embodiment, the system 100 calculates the amount of the constituent that is depleted from the bath as a result of elapsed time and elapsed amp-minutes at steps 320 and 325, respectively. The resulting values are then combined at step 330 to arrive at the total depletion value.

At step 335, the total depletion value obtained at step 330 is analyzed to determine whether dosing of a chemical is required. For example, the total depletion value can be compared to a predetermined threshold value or predetermined range of values to arrive at the dosing decision. If this analysis determines that dosing is indeed required, the automated chemical management system 100 dispenses a predetermined volume of the replenishment chemical to the respective slipstream as shown at step 340. After the predetermined volume of replenishment chemical has been dispensed or, alternatively, if the analysis of the total depletion value indicates that no dosing is required, the chemical management system 100 checks the analysis schedule at step 345 to determine whether the time has arrived to execute an analytical measurement cycle. If no analysis is required at that time, the foregoing sequence of operations is repeated beginning at step 320. If the time has come for the execution of an analysis, a sample of the electrolyte is removed from the respective slipstream and analyzed using the technique and corresponding parameters provided by the operator during system initialization. Once the analysis results have been obtained, the chemical management system 100 makes a decision on whether or not dosing is required. This decision is illustrated at step 355. If dosing is required, the amount of the chemical that is to be injected into the respective slipstream is calculated at step 360. Alternatively, the volume of dispensed chemical can be a constant set by the operator during the system initialization process. In either instance, the requisite volume of the replenishment chemical is dispensed at step 365. After this replenishment or, alternatively, when no analysis based dosing is needed, the chemical management system 100 proceeds to use the analytical measurement results to modify the equations used to calculate depletion of the constituent based on elapsed time and elapsed amp-minutes since the last replenishment. For example, as shown at step 370, the coefficients of the equations used in such calculations may be modified. Such modification assists in effectively refining the replenishment operations executed by the chemical management system 100 to insure more precise control over the concentration of the targeted constituent. Once this modification has been completed, the chemical management system 100 repeats the foregoing sequence of operations using the modified equations by returning again to step 320.

A detailed embodiment of the automated chemical management system 100 is set forth below with specific reference to its use in managing a copper electroplating bath. However, in view of the teaching set forth herein, it will be recognized that the automated chemical management system 100 can be used to control the constituents of a wide range of electrolytes used to deposit various materials onto the surface of a microelectronic workpiece.

In connection with the management of a copper electroplating bath, the automated chemical management system 100 may be configured to analyze the following electroplating bath constituents and to use them for replenishment as needed:

Electrolyte—The electrolyte for copper plating is generally a pre-mixed solution containing copper, sulfuric acid, and chloride ion at target bath concentrations. In the example set forth here, this component is not used to control concentrations based on analysis results but, rather, it is used to replace electrolyte removed from the bath by workpiece drag-out and analysis sample extraction. As such, the electrolyte is only used for replenishment in the sample loss based mode and/or the bath make-up mode. Further, dosing of the electrolyte may be executed in accordance with an equation that estimates the amount of workpiece drag-out that has occurred based the number of workpieces processed by the electrochemical deposition tool. The number of processed workpieces may be communicated from the electrochemical deposition tool to the system 100 over the corresponding communication link.

Rather than dosing an amount of electrolyte, the system 100 may dose the independent components used to form the base electrolyte. Such components may include, for example, copper, acid and water.

Accelerator—The accelerator is an organic additive provided to the plating bath to obtain certain properties in the deposited copper. This component is often supplied from chemical vendors at 100% concentration. It may be used to control the brightener concentration in the bath as reported by the analyzer. Dosing of the accelerator into the electroplating bath of a given electrochemical deposition tool 105a–105d may be based on a combination of analysis results, elapsed amp-minutes since the last accelerator replenishment, and elapsed time since the last accelerator replenishment.

Suppressor—The suppressor is another organic additive that is included in the plating bath to obtain certain properties in the deposited copper. This component is also typically supplied from chemical vendors at 100% concentration. Dosing of the suppressor may be based on analysis results, elapsed amp-minutes since the last suppressor replenishment, and elapsed time since the last suppressor replenishment.

Hydrochloric Acid—Hydrochloric acid is an inorganic component of the electrolyte solution that is included in the plating bath to affect certain properties of the deposited copper. In the disclosed embodiment, this component is supplied in a low concentration (probably 0.01–0.1N), and is used to control the chloride ion concentration in the plating bath. Dosing of this component is done based solely on chloride ion concentration analysis results.

Even though all four chemistries may not be dosed pursuant to the same dosing mode or modes, each dosing channel and analytical measurement system/dosing system 122 may be configured so that it is capable of dosing in each of the foregoing modes. This provides for great system versatility. For example, the operator may want to enable time based dosing, but not analysis based dosing for suppressor and/or accelerator bath constituents so that the chemical management system 100 operates in an open-loop manner.

Example of Brightener Concentration Control

The following is an example of how the brightener component of the plating bath may be controlled in accordance with the foregoing principles. Experimental analysis has determined that the concentration of the brightener decays with respect to both elapsed time and elapsed amp-minutes and, therefore, both dosing modes are used. Further, brightener replenishment is conducted by adding an amount of accelerator to the electroplating bath. The example also assumes that the brightener is subject to an analytical measurement cycle every 5 hours.

Figure 4:
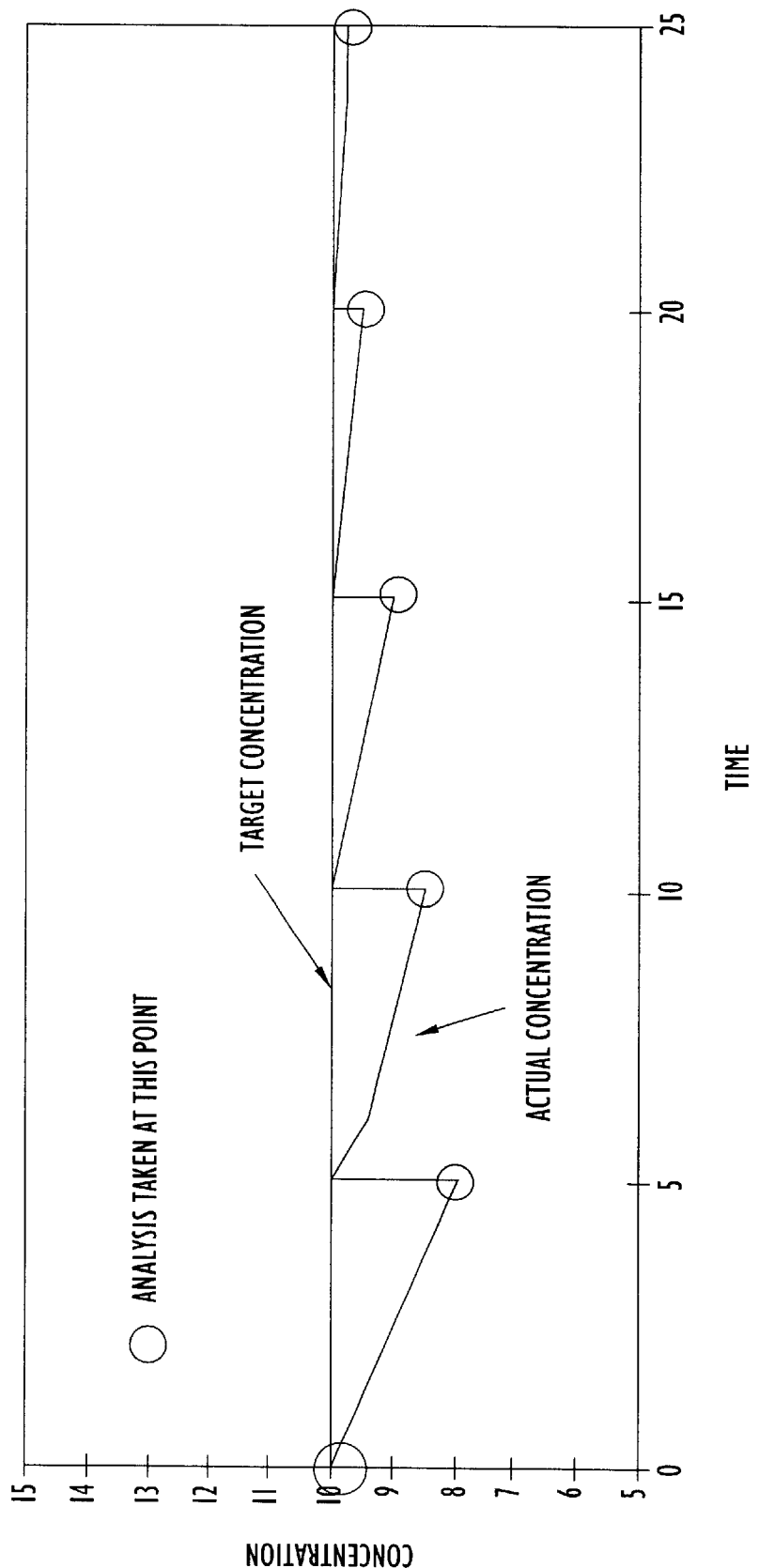
FIG. 4 is a graph illustrating the concentration of a bath constituent over the time in which various replenishment and analysis operations take place.

FIG. 4 is a graphical representation of the concentration of the brightener with respect to the time over a period in which various exemplary replenishment and analysis operations are executed. At time equals 0, the concentration of brightener is known with a value of 10 units. As time passes, the automated chemical management system 100 replenishes the bath with an amount of accelerator to compensate for brightener concentration decay resulting from both elapsed time and elapsed amp-minute. The replenishment takes place at the initial rates set by the operator. However, as evidenced by the substantial fluctuation of brightener concentration shown in FIG. 4, the initial rates that have been set by the operator are too low to maintain the brightener at the desired target concentration. Consequently, at time equals 5 hours, when an analysis is taken, the analysis results indicate that the actual concentration of the brightener in the plating bath is 8 units. The chemical management system 100 then doses the accelerator in a volume sufficient to bring the brightener concentration of the bath up to the target value (analysis based replenishment). Using the analysis measurements, the system also proceeds to automatically adjust the equations used to calculate the replenishment rates (for time and amp-minute based replenishment) so as to maintain the brightener concentration closer to the target value between analytical measurement cycles. The replenishment continues at the new rate until the next analysis, which occurs at time equals 10 hours. In the illustrated embodiment, the analysis results in a measured accelerator concentration of 8.5 units. Again, the automated chemical management system 100 doses an amount of the accelerator to bring the brightener concentration of the electrochemical bath up to the target concentration and, further, adjusts the parameters associated with the replenishment rates. The foregoing sequence of operations continues indefinitely, with the goal of narrowing in on the precise dosing equations/parameters needed to insure that the calculated concentration of the brightener in the bath corresponds to the actual concentration and that the replenishment that takes place as a result of these calculations maintains the brightener concentration at the target value without overshooting its target concentration value. Modification of the equations/parameters compensates for the fact that the consumption rate of many additives, particularly organic additives, generally changes over the life of a plating bath. In the event that the analytical measurement operation returns a result that is greater than the target value, there may be an operator selectable option to inhibit dosing to the bath for a period of time and/or amount of amp-minutes that is sufficient to deplete the accelerator to the target value as calculated by the then-current concentration decay rates for elapsed time and amp-minutes.

In one of its simplest form, the determination of the total concentration decay of a given bath constituent based on elapsed time and elapsed amp-minutes can be determined from the following equation:

$$Conc.Decay_{Total} = (A*\Delta t) + (B*\Delta am)|$$

where:
- A—Time based replenishment rate coefficient in ml/min
- Δt—The amount of time in minutes, since the last replenishment was performed.
- B—Amp-minute replenishment rate coefficient in ml/amp-min
- Δam—The number of applied amp-minutes during the time period since the last replenishment was performed.

In this scenario, it is the coefficients of the equation that may be modified in response to the measurements obtained during the analytical measurement cycles.

Automatic adjustment of the coefficients may be accomplished by weighing the amount of time and amp-minutes that have passed since the last analytical measurement cycle. The following formulas, for example, can be used to calculate the new coefficients that are to be used after an analytical measurement cycle has been completed.

$$A_i = A_{i-1} + C\left(\frac{(\Delta ml/L)(V)}{\Delta T}\right)\left(1 - \frac{\Delta AM}{(Y)(\Delta T)}\right)\Big|$$

Time Based Coefficient Adjustment $$B_i = B_{i-1} + D\left(\frac{(\Delta ml/L)(V)(\Delta AM)}{(\Delta T)^2(Y)^2}\right)\Big|$$

Amp-minute Based Coefficient Adjustment
where:
- $A_i$—New time based replenishment rate in ml/min
- $A_{i-1}$—Previous time based replenishment rate in ml/min
- $B_i$—New amp-minute replenishment rate in ml/amp-min
- $B_{i-1}$—Previous amp-minute replenishment rate in ml/amp-min
- C—Confidence factor (optional). This may be an operator defined value from 0–100% that allows the operator to influence the magnitude of the coefficient adjustment. A value of 0 will cause the coefficient to remain at the same value over time.
- D—This is the operator selected confidence factor for the amp-minute based replenishment. Its affect is similar to parameter C above.
- Δ[ml/L]—The difference between the target value and the measured value in ml/L. This can be a negative value resulting in a decrease of the replenishment rate. (target—measured)V—Volume of the plating bath in Liters. This value may be set by the operator during system initialization.
- ΔT—The amount of time in minutes, since the last analysis was performed.
- ΔAM—The number of applied amp-minutes during the time period since the last analysis was performed.
- Y—The maximum number of amp-minutes that can be applied to the bath in one minute. User definable value in units of amp-minutes/minute.

If ΔAM<0, then set ΔAM=0
If ΔAM>Y*ΔT, then set ΔAM=Y*ΔT

Parameter Adjustment Example

For exemplary purposes, the sequence of events in the bath control example set forth in FIG. 4 have been given the following corresponding parameter values:
- $A_0$=1 ml/min;
- $B_0$=1 ml/amp-min;
- C=50%;
- D=50%;
- ΔAM=500 amp-min;
- Y=36 amp-min/min;
- ΔT=300 minutes.

At time equal to 5 hours, the first value for Δ ml/L is 2 ml/L (target of 10 ml/L-analysis of 8 ml/L). By solving for $A_1$, the new rate of time based replenishment is set to 1.43 ml/min. Similarly, solving for $B_1$ the new rate of replenishment for amp-minutes is set to 1.00 ml/amp-min. These new rates are subsequently used to calculate concentration decay for replenishment determinations until the next analytical measurement cycle. At that point, time equal to 10 hours, Δ ml/L=1.5 ml/L, and, assuming all other parameters are the same, $A_2$ will be set to 1.75 ml/min while $B_2$ will be set to 1.00 ml/amp-min. The chemical management system 100 may be programmed to make these replenishment rates (equation coefficients) available for adjustment and viewing by the operator through the general user interface 145. Further, the values may be tracked and logged as system parameters by auditing programs employed in the system 100.

Numerous modifications may be made to the foregoing system without departing from the basic teachings thereof. Although the present invention has been described in substantial detail with reference to one or more specific embodiments, those of skill in the art will recognize that changes may be made thereto without departing from the scope and spirit of the invention as set forth in the appended claims.

What is claimed is:

1. An automated chemical management system for controlling a mixture containing multiple chemical constituents, the automated chemical management system comprising:
   (a) a dosing system adapted to dose an amount of one or more chemicals to replenish a target bath constituent in accordance with at least one predetermined dosing equation;
   (b) an analytical measurement system adapted to provide a measurement result indicative of the amount of the target constituent in a electrochemical bath; and
   (c) at least one predetermined dosing equation of the dosing system being modified in response to the measurement results.

2. An automated chemical management system as set forth in claim 1 wherein the target bath constituent is an organic additive.

3. An automated chemical management system as set forth in claim 2 wherein the analytical measurement system is adapted to execute an electroanalytical technique to obtain the measurement result.

4. An automated chemical management system as set forth in claim 1 wherein the analytical measurement system measures the concentration of the target constituent in the bath.

5. An automated chemical management system as set forth in claim 1 wherein the predetermined dosing equation is comprised of a variable part and one or more constants, the constants of the predetermined dosing equation being modified in response to the measurement results obtained by the analytical measurement system.

6. An automated chemical management system as set forth in claim 1 wherein the dosing system is adapted to dose an amount of one or more chemicals based on elapsed-time since a prior dosing of the one or more chemicals.

7. An automated chemical management system as set forth in claim 1 wherein the dosing system is adapted to dose an amount of the one or more chemicals in response to elapsed amp-time since a prior dosing of the one or more chemicals.

8. An automated chemical management system as set forth in claim 1 wherein the dosing system is adapted to dose an amount of the one or more chemicals in direct response to the measurement result provided by the analytical measurement system.

9. An automated chemical management system as set forth in claim 1 wherein the dosing system is adapted to dose an amount of one or more chemicals that are used to replenish an electroplating bath and wherein the analytical measurement system is adapted to provide a measurement result indicative of the amount of a given constituent in the electroplating bath.

10. An automated chemical management system as set forth in claim 1 wherein the analytical measurement system performs measurements at predetermined time intervals set by a system operator.

11. An automated chemical management system as set forth in claim 1 and further comprising a user interface through which an operator can set operational parameters for the dosing system and the analytical measurement system.

12. An automated chemical management system as set forth in claim 11 wherein the set of operational parameters comprises two or more dosing modes that are to be concurrently used in connection with the target bath constituent.

13. An automated chemical management system as set forth in claim 11 wherein the set of operational parameters comprises an analytical technique for use in analyzing the target bath constituent.

14. An automated chemical management system for managing the chemical content of an electrochemical bath comprising:
(a) a dosing system having,
(1) a predetermined elapsed time based dosing mode of operation in which dosing of an amount of one or more chemicals for replenishment of one or more electrochemical bath constituents is executed in accordance with a predetermined elapsed time equation;
(2) a predetermined elapsed amp-time based dosing mode of operation in which dosing of an amount of one or more chemicals for replenishment of one or more electrochemical bath constituents is executed in accordance with a predetermined amp-time equation;
(b) an analytical measurement system adapted to provide measurement results indicative of the amount of the one or more constituents in the electrochemical bath; and
(c) the predetermined elapsed time equation and the predetermined elapsed amp-time equation being modified by the automated chemical management system in response to the measurement results.

15. An automated chemical management system as set forth in claim 14 wherein the one or more bath constituents comprises an organic additive.

16. An automated chemical management system as set forth in claim 15 wherein the analytical measurement system is adapted to execute an electroanalytical technique to obtain a measurement result for the organic additive.

17. An automated chemical management system as set forth in claim 14 wherein the analytical measurement system measures the concentration of the one or more bath constituents.

18. An automated chemical management system as set forth in claim 14 wherein the predetermined elapsed time equation is comprised of a variable part and one or more constants, the constants of the predetermined elapsed time equation being modified in response to the measurement results obtained by the analytical measurement system.

19. An automated chemical management system as set forth in claim 14 wherein the predetermined elapsed amp-time equation is comprised of a variable part and one or more constants, the constants of the predetermined elapsed amp-time equation being modified in response to the measurement results obtained by the analytical measurement system.

20. An automated chemical management system as set forth in claim 14 wherein the dosing system further comprises a replenishment mode in which an amount of one or more chemicals is dosed in direct response to the measurement result provided by the analytical measurement system.

21. An automated chemical management system as set forth in claim 14 wherein the analytical measurement system performs measurements at predetermined time intervals set by a system operator.

22. An automated chemical management system as set forth in claim 14 and further comprising a user interface through which an operator can set operational parameters for the dosing system and the analytical measurement system.

23. An automated chemical management system as set forth in claim 22 wherein the set of operational parameters comprises two or more dosing modes that are to be concurrently used in connection with the one or more bath constituents.

24. An automated chemical management system as set forth in claim 22 wherein the set of operational parameters comprises an analytical technique for use in analyzing the one or more bath constituents.

25. An automated chemical management system for managing the chemical content of an electrochemical bath comprising:
(a) a programmable dosing system adapted to dose an amount of one or more chemicals in accordance with a plurality of concurrently operating dosing modes, the plurality of modes including an elapsed time based dosing mode, an elapsed amp-time based dosing mode, or an analysis based dosing mode;
(b) an analytical measurement system adapted to measure the concentration of a target electrochemical bath constituent at predetermined time intervals;
(c) the analysis based dosing mode operating in response to the concentration measurements to dose an amount of the one or more chemicals; and
(d) operation of the elapsed time based dosing mode and of the elapsed amp-time based dosing mode being modified in response to the concentration measurements obtained during analysis based dosing.

26. An automated chemical management system as set forth in claim 25 and further comprising a user interface through which an operator can set operational parameters for the dosing system and the analytical measurement system.

27. An automated chemical management system as set forth in claim 25 wherein the set of operational parameters comprises two or more dosing modes that are to be concurrently used in connection with the one or more bath constituents.

28. An automated chemical management system as set forth in claim 25 wherein the set of operational parameters comprises an analytical technique for use in analyzing the one or more bath constituents.

29. An automated chemical management system as set forth in claim 1 wherein said automated chemical management system has means for preventing backflow of a replenishment chemical into the line transporting the bath solution to said analytical measurement system.

30. An automated chemical management system as set forth in claim 14 wherein said automated chemical management system has means for preventing backflow of a replenishment chemical into the line transporting the bath solution to said analytical measurement system.

31. An automated chemical management system as set forth in claim 25 wherein said automated chemical management system has means for preventing backflow of a replenishment chemical into the line transporting the bath solution to said analytical measurement system.

32. A method for controlling a mixture containing multiple chemical constituents, the method comprising the steps of:
   (a) dosing an amount of one or more chemicals to replenish a bath constituent in accordance with one or more predetermined dosing equations;
   (b) analytically measuring the amount of a target constituent in the bath; and
   (c) modifying one or more of the predetermined dosing equations in response to the measurement results.

33. (New) The method as claimed in claim 32 wherein the target bath constituent is an organic additive.

34. The/method as claimed in claim 32 wherein the step of analytically measuring employs an electroanalytical technique to obtain the measurement result.

35. The method as claimed in claim 32 wherein the measurement result indicates the concentration of the target constituent in the bath.

36. The method as claimed in claim 32 wherein said predetermined dosing equations are comprised of a variable part and one or more constants, the constants of the predetermined dosing equation being modified in response to the measurement results obtained by the analytical measuring.

37. The method as claimed in claim 32 wherein said dosing of one or more chemicals is based on elapsed time since a prior dosing of said one or more chemicals.

38. The method as claimed in claim 32 wherein said dosing of one or more chemicals is based on elapsed amp-time since a prior dosing of said one or more chemicals.

39. The method as claimed in claim 32 wherein said dosing of one or more chemicals is based on the measurement result provided by analytical measuring.

40. The method as claimed in claim 32 wherein an operator sets operational parameters for the dosing and for the analytical measuring.

41. The method as claimed in claim 40 wherein said operator selects two or more dosing modes that are to be concurrently used in connection with the target bath constituent.

42. The method as claimed in claim 40 wherein said operator selects an analytical technique for use in analytically measuring the target bath constituent.

43. A method for controlling the chemical content of an electrochemical bath, the method comprising the steps of:
   (a) dosing an amount of one or more chemicals to replenish an electrochemical bath constituent in accordance with:
      (1) a predetermined elapsed time based dosing mode of operation in which dosing of an amount of one or more chemicals for replenishment of one or more electrochemical bath constituents is executed in accordance with a predetermined elapsed time equation; and
      (2) a predetermined elapsed amp-time based dosing mode of operation in which dosing of an amount of one or more chemicals for replenishment of one or more electrochemical bath constituents is executed in accordance with a predetermined amp-time equation;
   (b) analytically measuring the amount of the one or more constituents in the electrochemical bath; and
   (c) the predetermined elapsed time equation and the predetermined elapsed amp-time equation being modified by the automated chemical management system in response to the measurement results.

44. The method as claimed in claim 43 wherein the target electrochemical bath constituent is an organic additive.

45. The method as claimed in claim 44 wherein the step of analytically measuring employs an electrical analytical technique to obtain the measurement result for the organic additive.

46. The method as claimed in claim 43 wherein the measurement result indicates the concentration of one or more bath constituents.

47. The method as claimed in claim 43, wherein said predetermined dosing equations are comprised of a variable part and one or more constants, the constants of the predetermined dosing equation being modified in response to the measurement results obtained by the analytical measuring.

48. The method is claimed in claim 43 wherein said predetermined elapsed-time equation is comprised of a variable part and one or more constants, the constants of the predetermined elapsed amp-time equation being modified in response to the measurement result obtained by the analytical measuring.

49. The method as claimed in claim 43 wherein said dosing step comprises replenishing one or more chemicals based on the measurement result provided by the analytical measuring step.

50. The method as claimed in claim 43 wherein the analytical measuring step is performed at predetermined time intervals set by a system operator.

51. The method as claimed in claim 43 wherein an operator sets the operational parameters for the dosing step and the analytical measuring step.

52. The method as claimed in claim 51 wherein the operator selects two or more dosing modes that are to be concurrently used in connection with one or more bath constituents.

53. The method as claimed in claim 51 wherein the operator selects an analytical technique for use in analytically measuring the target one or more bath constituents.

54. A method for controlling the chemical content of an electrochemical bath, the method comprising the steps of:
   (a) dosing an amount of one or more chemicals in accordance with a plurality of concurrently operating dosing modes, the plurality of dosing modes including an elapsed time based dosing mode, an elapsed amp-time based dosing mode, or an analysis based dosing mode;

(b) analytically measuring the concentration of a target electrochemical bath constituent at predetermined time intervals;

(c) operating said analysis based dosing mode in response to the concentration measurements to dose an amount of one or more chemicals; and (d) modifying the elapsed time based dosing mode and the elapsed amp-time based dosing mode in response to the concentration measurements obtained during the analysis based dosing.

55. The method as claimed in claim 54, wherein the operator sets the operational parameters for the dosing step and for the analytical measuring step.

56. The method as claimed in claim 54, wherein the operator selects two or more dosing modes that are used concurrently to replenish one or more bath constituents.

57. The method as claimed in claim 54, wherein the operator selects an analytical technique for analyzing one or more bath constituents.

* * * * *